United States Patent
Ruekberg

[15] 3,674,060
[45] July 4, 1972

[54] APPARATUS FOR FILLING AND ADJUSTING THE CONTENTS LEVEL IN FLEXIBLE CONTAINERS

[72] Inventor: Herbert S. Ruekberg, Highland Park, Ill.
[73] Assignee: Continental Can Company, Inc., New York, N.Y.
[22] Filed: Dec. 14, 1970
[21] Appl. No.: 97,863

Related U.S. Application Data

[62] Division of Ser. No. 736,139, June 11, 1968, Pat. No. 3,577,698.

[52] U.S. Cl. .................................141/83, 53/52, 53/393, 141/114, 141/168, 53/281
[51] Int. Cl. ..................................B65b 57/00, B65b 61/00
[58] Field of Search.....................53/52, 124, 281, 287, 282, 53/393; 141/77, 83, 114, 168, 313, 314

[56] References Cited

UNITED STATES PATENTS

| | | |
|---|---|---|
| 2,329,311 | 9/1943 | Waters....................................53/37 X |
| 2,339,896 | 1/1944 | Waters..................................141/114 X |
| 2,723,069 | 11/1955 | Shanhouse et al. .....................141/114 |
| 3,103,089 | 9/1963 | Allen ....................................53/40 X |
| 3,342,009 | 9/1967 | Anderson...............................53/22 R |
| 3,457,694 | 7/1969 | Tatibana.....................................53/39 |
| 3,491,803 | 1/1970 | Galik ...................................53/282 X |

*Primary Examiner*—Robert L. Spruill
*Attorney*—Americus Mitchell, Joseph E. Kerwin and William A. Sittmann

[57] ABSTRACT

An apparatus for filling a plastic bottle with a premeasured amount of liquid, squeezing the plastic bottle until the level of liquid in the bottle comes to a predetermined height and then capping and sealing the bottle.

11 Claims, 8 Drawing Figures

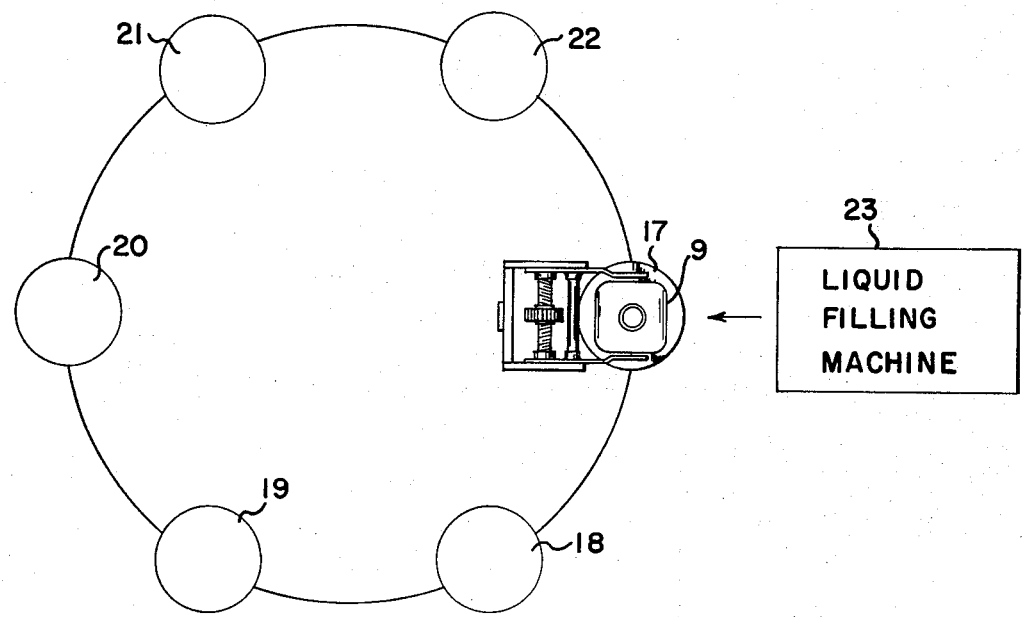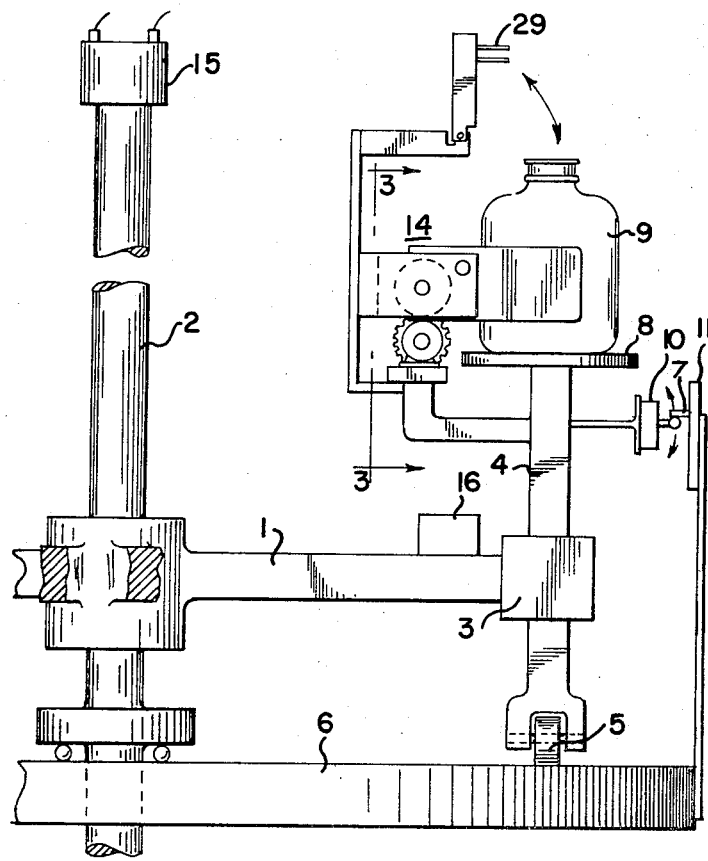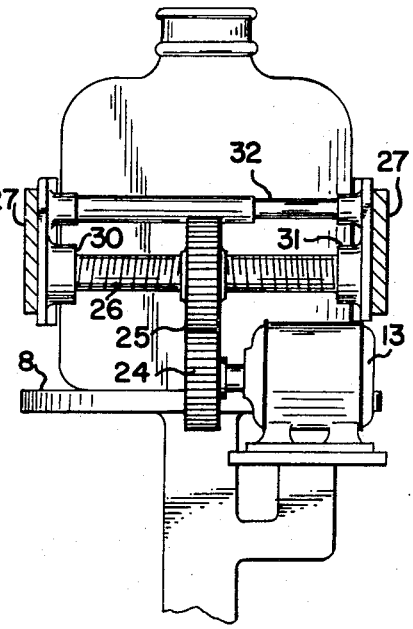

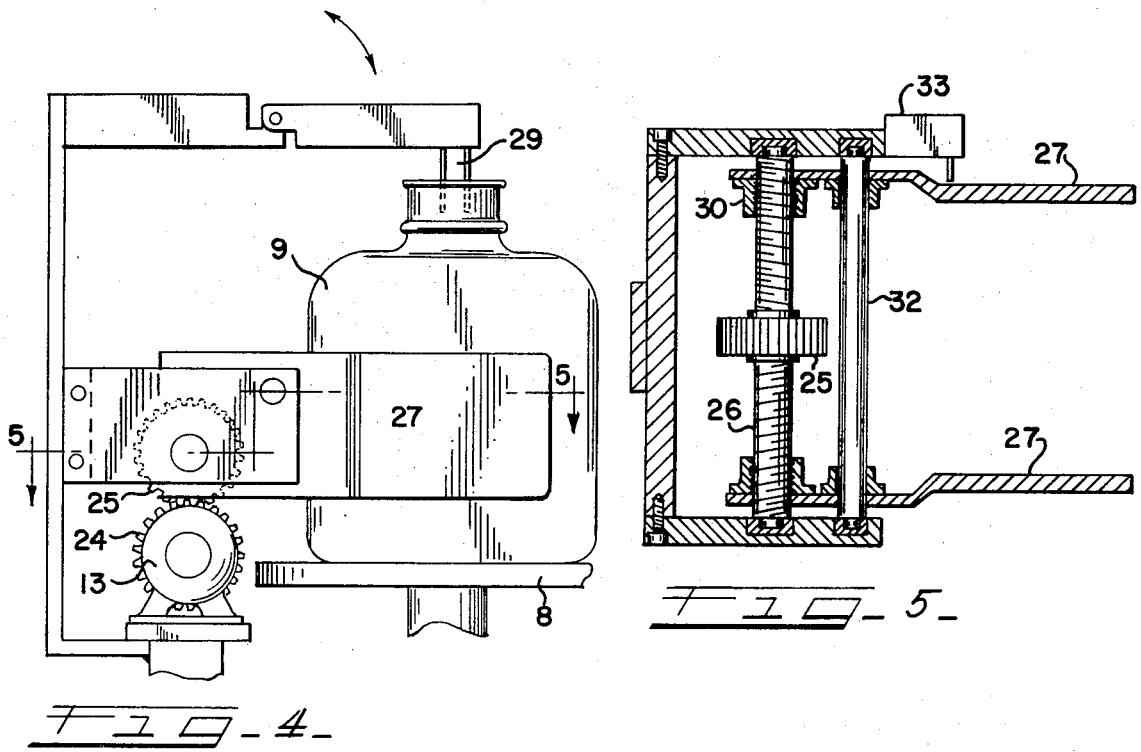
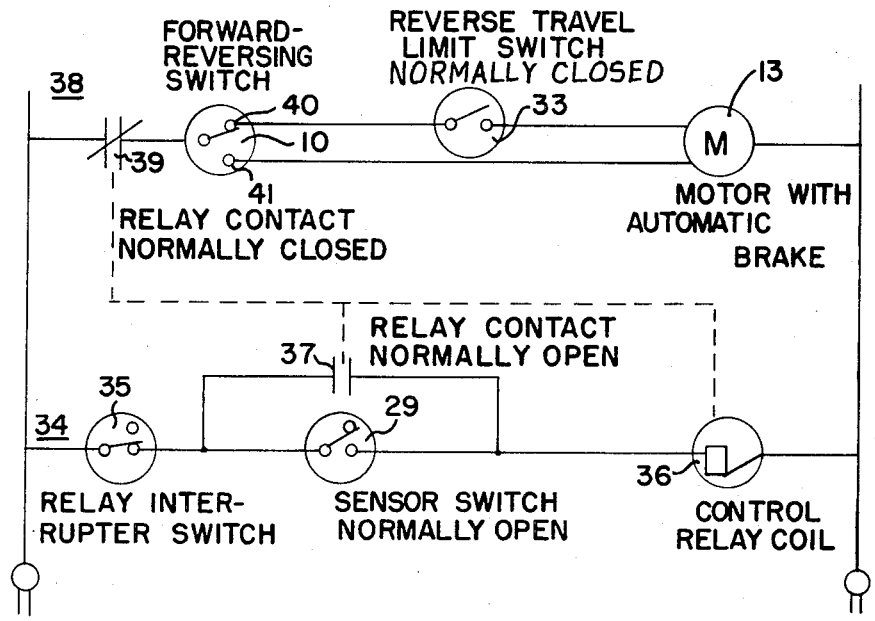

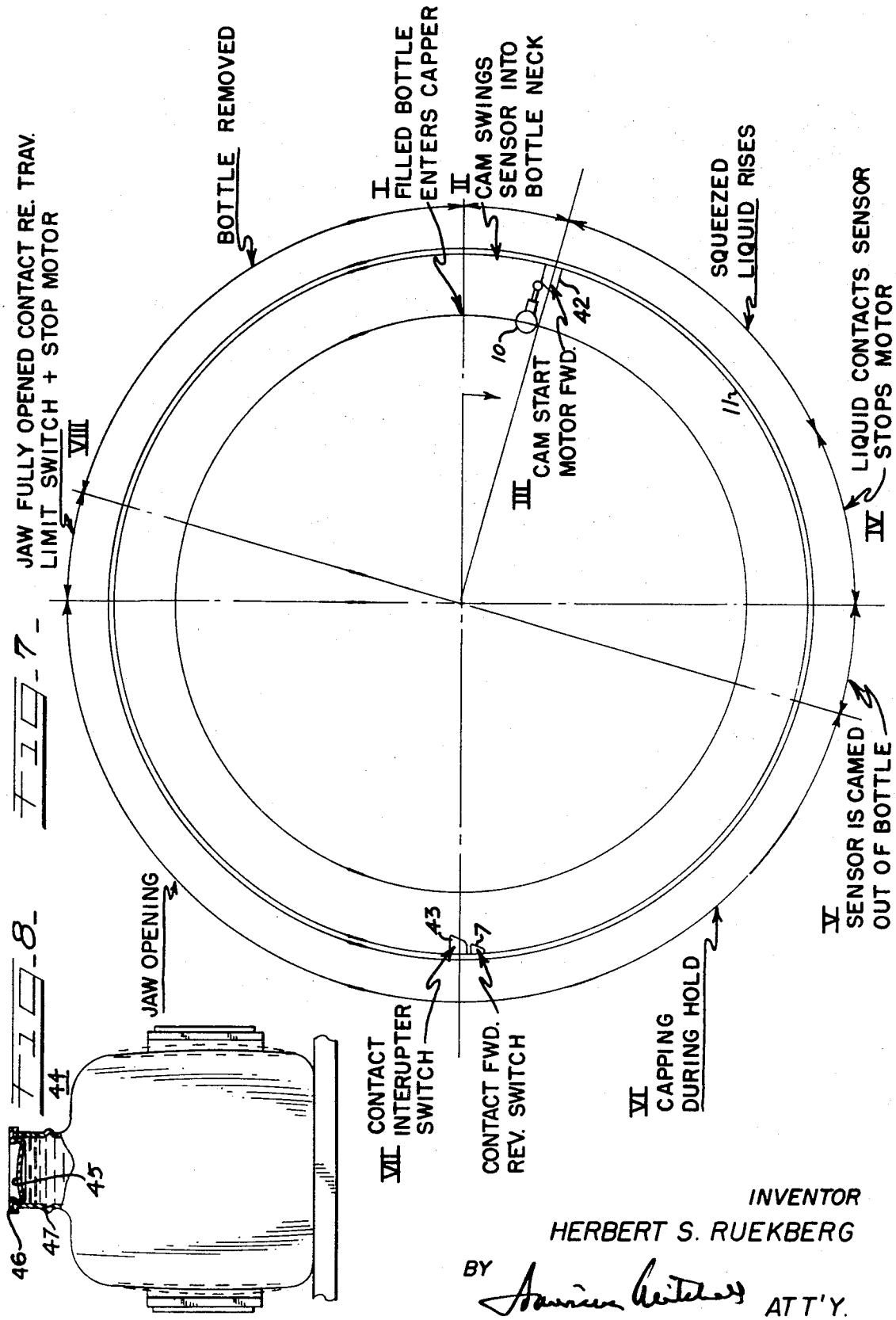

3,674,060

APPARATUS FOR FILLING AND ADJUSTING THE CONTENTS LEVEL IN FLEXIBLE CONTAINERS

This application is a division of my application titled "METHOD AND MEANS FOR FILLING AND SEALING A FLEXIBLE CONTAINER," by Herbert S. Ruekberg, Ser. No. 736,139 filed June 11, 1968 now U.S. Pat. No. 3,577,698 and assigned to Continental Can Company, Inc., assignor of this invention.

My invention relates to a machine for filling, capping and sealing plastic bottles and more particularly to a machine for filling, squeezing and sealing plastic milk bottles to discourage tempering and give an indicator to show leaks, if any, in the bottle seal.

Up to this time, it has been difficult to fill plastic bottles, for example, half gallon and gallon milk bottles, with a correct amount of material and retain uniformity in liquid level because plastic bottles vary in size from bottle to bottle even though they may have been manufactured by the same machine. Thus, if the same amount of liquid is present in each bottle the apparent level of the contents may vary from bottle to bottle because of the variation in capacity in bottles present in such a manufactured series. The housewife is accustomed to seeing bottles filled to the top or at least to some uniform apparent height. Plastic bottles made by the same machine may vary in size from bottle to bottle in a manufactured series because each machine may have a variety of different molds and each mold may form bottles of a somewhat different size because of variations from mold to mold, variations in the heat of forming, variations in the mix of the plastic material and of other parameters. Since the bottles in a manufactured series come out in different sizes filling each of the bottles with a predetermined amount of liquid gives rise to a different level of liquid in each plastic bottle. When the customer who is about to purchase the bottle gives it a casual inspection, it appears to him that the bottles have different amounts of liquid each from the other because of the different liquid level in the various bottles. This apparent differences gives rise to customer dissatisfaction.

Another cause of bottle size variation is brought about by the use of printing on polyethylene bottles. If a polyethylene bottle is to have printing on it, the bottle is heat treated at the area where printing is to be placed. It is difficult to keep the amount of heat treating precisely the same from bottle to bottle and this heat treatment alters the capacity of a plastic bottle and introduces another variation in capacity between successive bottles of a series of plastic bottles. If a filling line composed of heat treated bottles and non-treated bottles are filled with the same amount of liquid, the variation in liquid height is apparent from bottle to bottle and becomes obvious to a customer. Customer dissatisfaction is indicated.

Plastic bottles are often made at the plant where they are to be filled. Most plastic bottles shrink during the first 24 hours of their existence. Thus, a bottle filled to a certain level immediately after being formed has a different level of liquid sometime later. Twenty-four hours after the formation and filling of a bottle the level of a given amount of liquid in a newly made plastic bottle is appreciably higher than the level immediately after the plastic bottle was filled. If the bottle is sealed internal pressure is generated and the seal may be broken.

Another source of variation in the size of plastic bottles is due to the cleansing process to which returnable bottles may be subjected. After newly formed bottles are used and returned they must be treated to cleanse them sufficiently to conform to the provisions of the sanitary code. The cleansing treatment may cause shrinkage in the size of the bottle. A normal filling run of both new and washed bottles may be mixed together in the filling line and be sold as a mixed batch to retain sales outlets. If the bottles are filled with a fixed amount of liquid, the variation in bottle size produces variations in the apparent height of the liquid in each of these bottles. Again customer dissatisfaction is indicated.

It is an object of this invention for plastic bottles of varying size to present a uniform filled appearance to the customer when filled with a certain volume of liquid no matter what the variation in size of the plastic bottle from its expected value may be.

It is another object of the present invention to make a tamper-proof bottle and bottle closure.

It is a final object of my invention to provide a bottle and bottle closure assembly which gives an indication if there is a leak in the bottle seal.

In brief, my invention contemplates an apparatus for filling and sealing plastic bottles by placing a predetermined amount of liquid into a slightly oversized plastic bottle and then squeezing the bottle until the liquid reaches a certain level in the bottle neck. Finally, the plastic bottle is sealed and the platens or other squeezing elements are moved away to give a series of bottles having apparently the same level of liquid in each one. When the individual bottle is sold, a customer may observe the liquid level in the bottle and in this way determine if the bottle has been opened or if the seal has leaked air into the bottle.

With the above and other objects in view that hereinafter appear, the nature of the invention will be more clearly understood by reference to the following detailed description, the appended claims and several views illustrated in the accompanying drawings.

FIG. 1 shows an overall view of a section of the level adjusting and capping machine.

FIG. 2 shows a schematic top plan view of FIG. 1 and the filling machine.

FIG. 3 shows an enlarged view taken along the line 3—3 of FIG. 1.

FIG. 4 shows a plastic bottle having a liquid level detector inserted into the top of the bottle.

FIG. 5 shows a section view along the line 5—5 of FIG. 4.

FIG. 6 shows the control circuit diagram for the apparatus.

FIG. 7 shows diagrammatically the programming of the operations for the apparatus.

FIG. 8 shows the bottle walls equalizing with a convex-concave cap as a seal.

The apparatus of FIG. 1 shows a partial cross-section of a level adjusting and sealing apparatus of my invention. The radial arms or disc assembly 1 is turned about a vertical post 2. Mounted at six or more places along the edge of the disc 1 are journals 3 in which a vertically reciprocal rod 4 slides. At the bottom of the rod is fixed a roller 5 or some other element to allow the bottom of the rod to pass freely over the stationary table 6 and any rising cam as the disc 1 revolves. At the top of the reciprocal rod 4 is a platform 8 for supporting the filled bottle 9 to be sealed. Fastened to the rod 4 is a single pole double throw forward and reversing switch 10 which is tripped by a cam 7 mounted on fence 11 and located in the path of switch assembly 10. A reversible motor 13 (FIG. 3) for operating the squeezing mechanism 14 is mounted to one side of the platform. Electric power to operate the squeeze mechanism 14 is supplied through slip rings 15 to the central rotating shaft and fed from the slip rings 15 by conventional means to the control circuit device 16 located on each arm convenient to each of the squeezing mechanisms.

For purposes of illustration this machine is shown in FIG. 2 as having six positions, 17 – 22. Located adjacent the machine is a liquid filler 23 for filling each of the plastic bottles 9 with a predetermined amount of liquid before capping. Then the plastic bottles are transported by conveyor means (not shown) to the first position in the capping machine. The liquid filler 23 is shown diagrammatically and may be any of the conventional metering devices or may be a valve controlled by a weighing scale. In any case, whether a liquid metering device or weighing scale is used, a predetermined amount of liquid is measured into the container before it passes to the capping machine. At this point the level of liquid in the oversized bottles is always lower than the level at the time of sealing.

The arrangement of the motor 13, gears 24, 25, double acting screw 26 and platens 27 of my apparatus are shown in FIGS. 3, 4 and 5. Attached to each of the platens 27 is a threaded nut 30 or 31 which operates to move the platens in a horizontal direction toward or away from each other when the screw 26 is rotated. The screw 26 is threaded in opposite directions starting from the screw ends toward the middle of the screw. The direction of rotation of the oppositely threaded screw 26 is controlled by motor 13 through gears 24 and 25. After the plastic bottle 9 has been positioned on the platform 8 (FIG. 4) a liquid level detection element 29 is swung into the top of the bottle 9. This liquid level detector 29 may be any of a variety of types found in the U. S. Patent Office classification system under Class 73, Subclass 290 and related subclasses. Ordinarily, the liquid level is determined with relation to the top of the bottle because for a most desirable result the level of the liquid should be adjacent the top of the bottle. However, it may be gauged as a predetermined distance from the bottom of the bottle if it is desired. In any case, after the liquid level detector is in place, the platens 27 begin to move together toward the center of the bottle squeezing the thin flexible sides of the bottle. As the walls of the container come into closer proximity, the liquid in the bottle rises until the liquid in the neck of the bottle is at a certain level which may be measured from the top or bottom of the plastic bottle. When the level in the neck of the bottle has reached a suitable height, the liquid level detector 29 acts as a control element to discontinue platen motor operation and stop the movement of the platens. If the liquid level detector is adjusted so that the level is allowed to come up near the bottle cap then each of the bottles after capping appears to be uniformly filled to capacity and the customer is satisfied.

Details of the squeezing apparatus are shown most clearly in FIGS. 3, 4 and 5 where two meshing gears 24, 25 are operated by motor 13 to cause rotation of the oppositely threaded screw 26. The gear 25 is splined to the screw and rotation of the gear 25 causes the rotation of the screw and consequent motion of the platens 27 in or out as the threaded nuts 30 and 31 move in or out in response to rotation of gear 25. The squeezing arms or platens 27 slide on guide shaft 32. In this way, the squeezing arms 27 may be moved toward each other by rotation of the motor 13 in one direction and moved away from each other by rotation of the motor in the opposite direction. As the arms move apart they actuate reverse travel limit switch 33 to stop motor 13.

The control circuit for each bottle position is shown in FIG. 6. One of these circuits is mounted near each of the platen motors. When the machine operates properly, the squeezing motor 13 moves the platens 27 together to the point where the liquid has reached an appropriate level, then the motor is stopped to hold the platens at a fixed position until the bottle has been sealed. After the bottle has been sealed or capped, the motor is reversed and moves its platens or arms back to an appropriate limit position so that the bottle is released and may be removed. The control circuit has two electrically parallel branches each composed of a series of elements. A first branch 34 has a relay interrupter switch 35, a normally open sensor switch 29, and a control relay coil 36 mounted in electrical series. The sole purpose of branch 34 is to control relay contact 39. Connected electrically across the sensor switch 29 is a control relay contact 37. Relay contact 39 and relay contact 37 are mechanically connected to relay coil 36 so that energization of coil 36 causes movement of the relay contacts. The other branch 38 has normally closed relay contact 39, forward and reversing single pole double throw switch 10 and motor 13 mounted in electrical series. The normally closed reverse travel limit switch 33 is electrically connected in series between the reversing terminal 40 and the motor 13. Motor 13 has an automatic brake mechanism. When the forward terminal 41 of the single pole double throw switch 10 is closed, the motor runs in one direction and alternatively when the reverse side 40 is closed the motor runs in the opposite direction. Sensor switch 29 is normally open, and closes when the level of liquid in the plastic bottle has reached a certain height.

The programming and operation of my bottle level adjusting and sealing device is shown in FIG. 7. For convenience of discussion, the programming is divided into eight operations. As the first operation, at about the position I shown in the figure, the filled bottle enters the machine. In the second operation, a cam swings the liquid level sensor into the bottle neck. In the third operation stationary cam 42 actuates forward-reversing switch 10 to start the squeezing plates 27 moving in a closed direction. Operation two is optionally before operation three. The plates or arms 27 squeeze bottle 9 until the liquid rises to a predetermined level when the liquid contacts the sensor switch 29 causing the fourth operation i.e. stopping the motor by closing sensor switch 29 which activates control relay coil 36 thus closing contact 37 and opening contact 39. As the fifth operation, the liquid being now at an appropriate level, the sensor 29 is cammed out of the bottle. In the sixth operation the bottle is sealed while the plates 27 are held stationary because screw 26 is not turning and the level of the liquid in the bottle is fixed at a predetermined height. In the seventh operation the motor direction is reversed by cam 7 while a separate cam 43 contacts interrupter switch 35 deactivating control relay coil 36, opening relay contact 37 and closing relay contact 39. The platens 27 move apart and release the bottle. As the arms or platens move apart one of them opens the normally closed limit switch 33 thus switching off the motor and stopping movement of the platens. The bottle is now removed from the bottle level adjusting and sealing machine and is conveyed to the next operation.

A brief description of the operation of the control circuit considered in conjunction with FIGS. 6 and 7 is as follows:

When the bottle enters the sealing machine the forward-reverse switch 10 is in reverse position, the sensor switch 29 is open, relay contact 37 is open and the reverse travel limit switch 33 is open. Now at position I the bottle enters the machine. At point II the sensor 29 is placed into the neck of the bottle. Shortly thereafter, at point III forward-reverse switch 10 is shifted to forward position by a cam 42 which is fixed to the frame 11 of the capping machine. Cams attached to the frame may operate control circuit switches as they pass. The motor starts the jaws moving in an inward direction. The normally closed reverse travel limit switch 33 closes as the jaws move inwardly. At position IV the liquid level has risen closing the sensor switch 29 which in turn activates the control relay coil 36 to open the contact 39 and stop motor 13. Contacts 37 close keeping the relay coil 36 activated even after the liquid level sensor switch 29 is lifted out of the liquid. At position V the sensor 29 is mechanically removed from the bottle neck. The mechanical action of the sensor in its insertion and removal is independent of the direct operation of the control circuit shown in FIG. 6 and is moved in and out mechanically by cams. At position VI the bottle 9 is capped or sealed while the platens 27 are held fixed. At position VII the fixed cam 7 shifts the single pole double throw switch 10 to reverse, and the fixed cam 43 momentarily opens relay interrupter switch 35 to deactivate control relay coil 36 thus opening relay contact 37 and closing relay contact 39 causing the motor 13 to start in the reverse direction to withdraw the platens. This operation continues until one of the platens contact the reverse limit switch 33, opens it and stops the motor at position VIII.

As may be seen most easily in the embodiment of FIG. 8 the cap 44 may be a convex-concave type to allow pressure to be exerted on its top side 45 without rupturing or deflecting the cap. As the pressure is exerted on the top side in this type cap, the cap is more securely sealed into the top of the bottle because the rim 46 of the cap is pushed outwardly against the sides of the bottle neck. When squeezing platen pressure is released and the platens are withdrawn a distance from the bottle, a pressure differential is applied downwardly across the sealing element. In this way, the bottle closure is retained in position by a negative pressure from inside the bottle. Any of a variety of bottle closures such as, a plug type or diaphragm cap may be used depending upon the situation. When platen support is removed the bottle settles somewhat and the walls of the bottle flex out until they reach an equilibrium condition.

Although this type sealing means appears most advantageous I contemplate that any sealing closure or means may be used and the atmospheric pressure tends to hold such a means in place.

The squeezing techniques may differ. These drawings show two squeezing platens, but one, two, or more may be used or the bottle may be twisted. With some bottle shapes, the pressure can be applied vertically, exerting pressure downwardly against ring 47, FIG. 8, during squeezing. This would also stabilize the bottle against distortion during the capping operation.

Other means for raising the liquid level in the bottle such as evacuating the air from the top of the bottle also falls within the scope of my invention.

Since the bottle has a considerable reserve capacity and the level of the liquid in the sealed bottle is up near the bottle closure when the bottle is sealed, it is readily appreciated that if the bottle closure is removed the level of the liquid in the bottle goes down. As pointed out above, the wall of the plastic bottle is thin and it is apparent that flexing of the wall by pressure of the hand when gripping the bottle prior to pouring may displace milk from the container. By use of my method the level of the liquid is lowered when the bottle is opened and there is less likelihood that gripping and lifting the bottle by hand will cause spillage from the bottle.

Some bottles today have handles to minimize this problem. However, handles increase the cost of the bottle and increase foaming during filling. Lowering of the liquid level from the top also makes pouring easier because there is less likelihood of spillage over the top of the plastic bottle at the beginning of the pour.

An advantage of the use of my apparatus for filling and capping a plastic bottle is that a customer can tell at a glance whether the bottle has been opened or whether the seal has leaked because the level of liquid in the bottle is low if either situation has occurred.

Another advantage is that when the bottle is opened the level of liquid in the bottle drops and makes for easier pouring.

Another advantage is that in the feed line of any series of plastic bottles the bottle sizes vary somewhat and by using my invention each bottle which is filled with a fixed amount of liquid appears essentially like each other bottle.

A final advantage is that my system is economical because it is not necessary to sort the bottles for size in order to give a nearly uniform appearance to the filled bottles when they are distributed to sales outlets.

The foregoing is a description of an illustrative embodiment of the invention and it is applicant's intention in the appended claims to cover all forms which fall within the scope of the invention.

What is claimed is:

1. A machine for adjusting the liquid level in a series of overcapacity flexible containers having differences of size from one to another comprising in combination:
    means for flexing a filled plastic container to raise the liquid level within said container,
    means for signalling when the liquid level reaches a predetermined height,
    control means for causing said flexing means to start in operation and responsive to said signalling means for stopping said flexing when said liquid has attained a predetermined height relative to said bottle.

2. A machine for filling and adjusting the liquid level in a series of overcapacity flexible containers having differences of size from one to another as set forth in claim 1 in which said flexing means comprises:
    means having platens mounted to be moved toward and away from each other whereby said flexible container may be pressed so that its volume is varied.

3. A machine for filling and adjusting the liquid level in a series of overcapacity flexible containers having differences of size from one to another as set forth in claim 1 in which said control means comprises:
    a switch mounted on a moving platform,
    a series of cams mounted in the path of travel of the switch and adapted to operate said switch, and
    a control circuit adapted to be turned on or off by said series of cam means mounted in the path of travel of said moving platform whereby said flexing means is started to adjust the headspace in said filled container to a predetermined level.

4. An apparatus for filling a series of flexible overcapacity containers having a filling opening, with identical volumes of liquid and maintaining identical headspaces in each container when capped in spite of differences of the capacity from one container to the next comprising:
    means for filling each said container with a predetermined amount of liquid,
    flexing means for moving two points on said container relative to each other,
    means for signalling when said liquid rises to within a predetermined distance from the top of the filling opening of said container,
    control means for causing said flexing means to start in operation after each said bottle has been filled with said predetermined amount of liquid and responsive to said signalling means for halting said moving when said liquid level has come to a predetermined distance from the top of the filling opening of said container.

5. An apparatus for filling a series of flexible overcapacity containers having a filling opening, with identical volumes of liquid and maintaining identical headspaces in each container when capped in spite of differences of the capacity from one container to the next as set forth in claim 4 in which said moving means comprises:
    a reversing motor for turning in one direction or the reverse depending on whether current is conducted to one terminal or another of said motor.

6. An apparatus for filling a series of flexible containers having a filling opening, with identical volumes of liquid and maintaining identical headspaces in each container when capped in spite of differences of the capacity from one container to the next as set forth in claim 4 in which said means for moving two areas on said container comprises:
    a plurality of movable means for causing movement of two points on said container relative to each other,
    reversing motor means connected to said movable means for changing the position of said movable means in response to signals from said control means.

7. An apparatus for filling a series of flexible overcapacity containers having a filling opening with identical volumes of liquid and maintaining identical headspaces in each container when capped in spite of differences of the capacity from one container to the next as set forth in claim 6 in which said signalling means comprises:
    a liquid level sensing means for detecting when the level of liquid in said flexible container comes within a predetermined distance from the top of the filling opening of said container.

8. An apparatus for filling a series of flexible overcapacity containers having a filling opening with identical volumes of liquid and maintaining identical headspaces in each container when capped in spite of differences of the capacity from one container to the next as set forth in claim 7 in which said signalling means further comprises:
    first camming means for moving said liquid level detecting means into said flexible container after said container has been filled with said predetermined amount of liquid, and
    second camming means for moving said liquid level detecting means out of said flexible container prior to capping and after said liquid level has risen to said predetermined distance from the top of said filling opening.

9. An apparatus for filling a series of flexible overcapacity containers having a filling opening with identical volumes of liquid and maintaining identical headspaces in each container when capped in spite of differences of the capacity from one container to the next as set forth in claim 5 further comprising:
- a rotatable means mounted for rotation about an axis,
- stations spaced from each other and mounted on said rotatable means for receiving an empty container,
- said means for filling each said container being located adjacent said rotatable means and being positioned to fill an empty receptacle mounted at a station with a predetermined amount of liquid,
- a fence extending adjacent the outer path of travel of said rotatable means,
- a first cam mounted on said fence for swinging said signalling means into said filling opening,
- a second cam spaced along said fence from said first cam for actuating a first switch to actuate said moving means to cause said two points to begin motion toward each other,
- a third cam spaced along said fence from said second cam for swinging said signalling means out of said filling opening,
- a first switch mounted on said station for causing said reversing motor to go forward and backward,
- a fourth cam spaced along said fence from said third cam for actuating said first switch to cause said motor means to reverse and allow said two points to begin motion away from each other,
- a fifth cam spaced along said fence from said fourth cam for moving a second switch whereby said motor means reverses and said two points begin motion away from each other, and
- a third switch in electrical series with said first switch and adapted to be opened when said motor means has traveled in a reversing direction to a predetermined limit whereby said motor is stopped.

10. An apparatus for maintaining identical headspaces in each container of a series of flexible overcapacity containers in spite of differences of the capacity from one container to the next where each container is filled with a predetermined quantity of liquid comprising:
- a rotatable means having a plurality of stations along its edge for receiving a plurality of flexible overcapacity containers, each said station comprising:
- a plurality of platens for deforming said flexible container,
- a dual wound reversing motor mounted at each said station for moving said platens relative to each other and having a common terminal and a first armature winding terminal and a second armature winding terminal,
- a control circuit for said motor means comprising,
- a first relay having normally closed contacts and a first and a second terminal,
- first conductive means connecting said first terminal to a first power line,
- a single pole double throw switch having a first terminal electrically connected to the movable contact arm and a second and third terminal each electrically connected to the fixed contact points of said switch,
- second conductive means connecting said second terminal of said first relay to said first terminal of said single pole double throw switch,
- third conductive means connecting said second terminal of said single pole double throw switch to said first armature winding terminal of said motor,
- fourth conductive means connecting said common terminal of said motor to a second power line,
- a first normally closed single pole single throw switch having a first and second terminal,
- a fifth conductive means connecting the third terminal of said single pole double throw switch to the first terminal of said first normally closed single pole switch,
- a sixth conductive means connecting the second terminal of said first single pole switch to the second armature winding terminal of said motor,
- a second normally closed single pole, single throw switch having a first and a second terminal,
- seventh conductive means connecting said first terminal to said first power line,
- a first normally open sensor switch having two terminals,
- eighth conducting means connecting the second terminal of said second normally closed single pole switch to the first terminal of said normally open sensor switch,
- a second relay having normally open contacts and a first and a second terminal,
- ninth conducting means connecting the second terminal of said second normally closed single pole switch to the first terminal of said second normally open relay,
- a control relay coil for closing said second relay and opening said first relay upon enerization of said coil and having a first and second terminal,
- tenth conducting means connecting the first terminal of said first normally open sensor switch to the first terminal of said control relay coil,
- eleventh conducting means connecting the second terminal of said normally open single pole switch to the first terminal of said control relay coil, and
- twelfth conducting means connecting the second terminal of said control relay coil to said second power line whereby said motor direction and extent of travel may be controlled by a series of cams mounted along the path of each said station and adapted to move said switches from one position to another.

11. An apparatus for maintaining identical headspaces in each container of a series of flexible overcapacity containers in spite of differences of the capacity from one container to the next where each container is filled with a predetermined quantity of liquid as set forth in claim 10 further comprising:
- a liquid filling means located near said rotatable means for filling each empty receptacle with a predetermined amount of liquid,
- a fence extending adjacent said rotatable means,
- first cam means mounted on said fence for swinging said sensor switch into said container,
- second cam means spaced along said fence from said first cam for actuating said single pole double throw switch to cause said motor to move said platens and cause said points of said flexible container to move toward each other,
- a third cam means spaced along said fence from said second cam means for swinging said sensor switch out of said container,
- a fourth cam means spaced along said fence from said third cam means for moving said double pole double throw switch and to allow movement of said platens to allow said points of said flexible container to move away from each other,
- a fifth cam means spaced along said fence from said fourth cam means for opening said second single pole, single throw switch to cause said motor means to reverse the direction of motion of said points, and
- said first normally closed single pole single throw switch being mounted adjacent said platens whereby as said platens move outward said switch is opened and said motor is stopped.

* * * * *